Jan. 10, 1928.
N. JENSEN
1,655,610
LINOLEUM KNIFE
Filed May 11, 1925
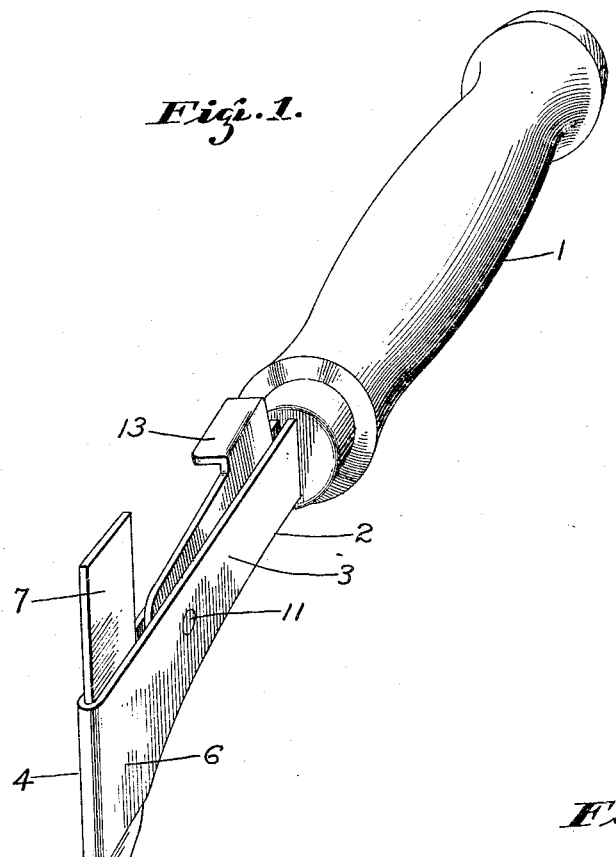
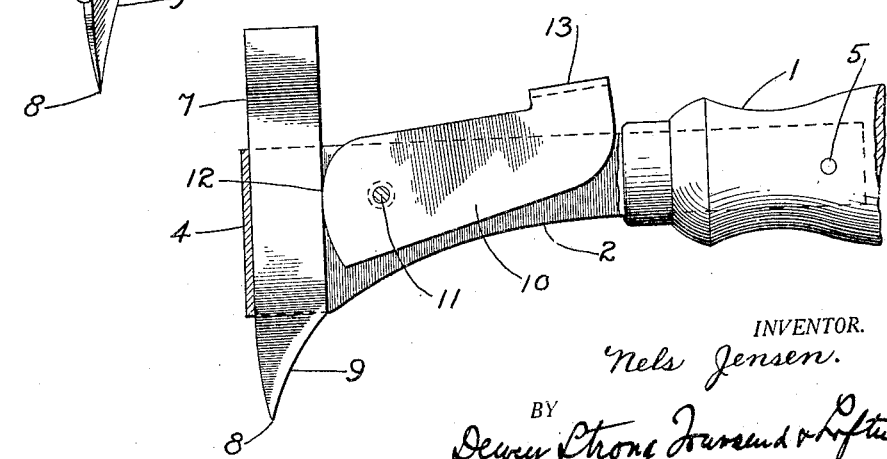
INVENTOR.
Nels Jensen.
BY
Dewey, Strong, Townsend & Loftus
ATTORNEYS.

Patented Jan. 10, 1928.

1,655,610

UNITED STATES PATENT OFFICE.

NELS JENSEN, OF GRASS VALLEY, CALIFORNIA.

LINOLEUM KNIFE.

Application filed May 11, 1925. Serial No. 29,299.

This invention relates to knives, and particularly to an improved linoleum knife. Knives ordinarily used in cutting linoleum have a short shank portion with the outer end thereof curved downwardly, forming a concave cutting edge and ending in a sharp cutting point. In use the sharp cutting point becomes dulled very quickly and must then be ground and sharpened. The peculiar shape of the knife, with its concavely curved cutting edge, makes this rather a difficult operation, and to again place the knife in good condition the point is necessarily ground back quite considerably. The cutting point is ground away very quickly and becomes less efficient at each resharpening. After being thus resharpened a very few times the knife becomes useless and must be thrown away. The primary object of my invention is to provide an improved linoleum knife having a removable blade which can be easily resharpened and which can always be adjusted to the same efficient cutting position, the blade being the only portion of the knife receiving any appreciable wear and being readily replaceable at little expense.

With the above and other objects in view, as will hereinafter appear, my invention consists in the features of construction and operation set forth in the following specification and illustrated in the accompanying drawing. In such drawing annexed hereto and forming a part of this specification, I have illustrated one specific embodiment of my invention, but it will be understood that the invention can be otherwise embodied and that the drawing is not to be construed as defining or limiting the scope of the invention, the claim appended to this specification being relied upon for that purpose.

Referring to the figures of the drawing,

Fig. 1 is a perspective view of a knife embodying my invention;

Fig. 2 is a fragmentary side elevation thereof partially broken away.

In the drawing, 1 indicates the handle and 2 the shank portion of my improved knife. This shank portion comprises a metal plate 3 bent upon itself U-shaped at the outer end 4. The free ends of the plate are secured in the handle by a rivet 5. The outer end of the shank is preferably enlarged at 6 to provide a broad supporting surface for a removable blade 7.

The blade 7 is made from a plain, plate-like bar of steel pointed at 8 and having a cutting edge 9. In its cutting position the blade rests in the U-shaped end of the shank, means being provided for binding the blade tightly against the U-end 4. As a means for thus holding the blade I have illustrated a lever-like plate 10 mounted between the two portions of the shank plate 3 on a pivot 11. The blade-engaging portion 12 of the lever is eccentric to the pivot in a manner to engage tightly against the blade when the thumb-portion 13 of the lever is pushed downwardly. The blade is thereby held secured tight against the U-end 4 by the locking lever. The blade can be released by raising the lever upwardly at 13.

It will be seen that my improved knife is exceedingly simple and cheap to manufacture. The plates 3 and 10 are sheet metal stampings which need only be bent to the shapes illustrated for use. The blades can also be very cheaply made from plain bars of steel stock.

In use the blade is assembled to the position illustrated, wherein the cutting edge 9 and point 8 face toward the handle. The blade is securely locked in place by the locking lever 10 and upward pressure on the blade in operation acts on the lever to more securely bind the blade in its holder. The blade can be adjusted to the most efficient or to any desired operating position. Furthermore, the sharpening and resharpening of the blade in no manner affects the efficiency of the knife, since the blade can be replaced in the holder to extend downwardly to any position desired. It is believed that the advantages and utility of my invention will be clear without further description herein.

Having thus described my invention, what I claim as new and desire to secure by Letters Patent is:

A cutter of the character described, comprising a strip of metal bent upon itself to form an outer connecting end portion and a pair of parallel interspaced side members, a handle in which the inner ends of the side members are secured, said side members presenting upper parallel straight edges and lower edges which taper outwardly to form a head of greater vertical height than the inner ends, a lever piotally mounted between the side members, a cam on the outer end of the lever and also disposed between the side members, a knife blade of the character described insertable between the side members at the outer end where the head is formed, the outer edge of the blade resting against the outer connecting end of the side members and the inner edge of the blade adapted to be engaged by the cam and to be secured between the cam and the outer connecting end and a right-angular finger actuated extension on the inner end of the lever, said extension adapted to be grasped to lift the inner end of the lever to swing the cam out of engagement with the knife blade and adapted to be depressed to swing the lever downwardly and to bring the cam into engagement with the knife and said right-angular extension also serving as a stop to limit downward movement of the lever between the side members.

NELS JENSEN.